March 15, 1966  J. J. SAHR  3,240,366
PORTABLE MATERIAL HANDLING APPARATUS
Filed Dec. 6, 1963  3 Sheets-Sheet 1

INVENTOR.
James J. Sahr
BY
Learman, Learman & McCulloch
ATTORNEYS

March 15, 1966 J. J. SAHR 3,240,366
PORTABLE MATERIAL HANDLING APPARATUS
Filed Dec. 6, 1963 3 Sheets-Sheet 2

INVENTOR.
James J. Sahr
BY
Learman, Learman & McCulloch
ATTORNEYS

March 15, 1966  J. J. SAHR  3,240,366
PORTABLE MATERIAL HANDLING APPARATUS
Filed Dec. 6, 1963  3 Sheets-Sheet 3

INVENTOR.
James J. Sahr
BY
Learman, Learman & McCulloch
ATTORNEYS

United States Patent Office 3,240,366
Patented Mar. 15, 1966

3,240,366
PORTABLE MATERIAL HANDLING APPARATUS
James J. Sahr, 9121 E. Washington Road,
Saginaw, Mich.
Filed Dec. 6, 1963, Ser. No. 328,735
4 Claims. (Cl. 214—17)

This invention relates to bulk materials handling apparatus and more particularly to a container for such materials which may be removably mounted on a truck or other vehicle and which is provided with self-contained means for effecting discharge of the materials from the container.

An object of this invention is to provide apparatus for facilitating the handling of bulk materials, such as fertilizers, and which is particularly suited for use in the loading of fertilizer spreaders in the field.

Another object of the invention is to provide apparatus of the kind referred to which is mountable on and demountable from a truck or other vehicle so as to prevent a general purpose truck or other vehicle from being limited in its use to the handling of bulk materials.

A further object of the invention is to provide bulk materials handling apparatus which is capable of containing simultaneously several kinds of materials and which is equipped with means for enabling selective removal of the materials.

Another object of the invention is to provide bulk material handling apparatus of the class described equipped with improved means for effecting delivery of the materials.

Other objects and advantages of the invention will be pointed out specifically or will become apparent from the following description when it is considered in conjunction with the appended claims and the accompanying drawings, in which:

Figure 1:
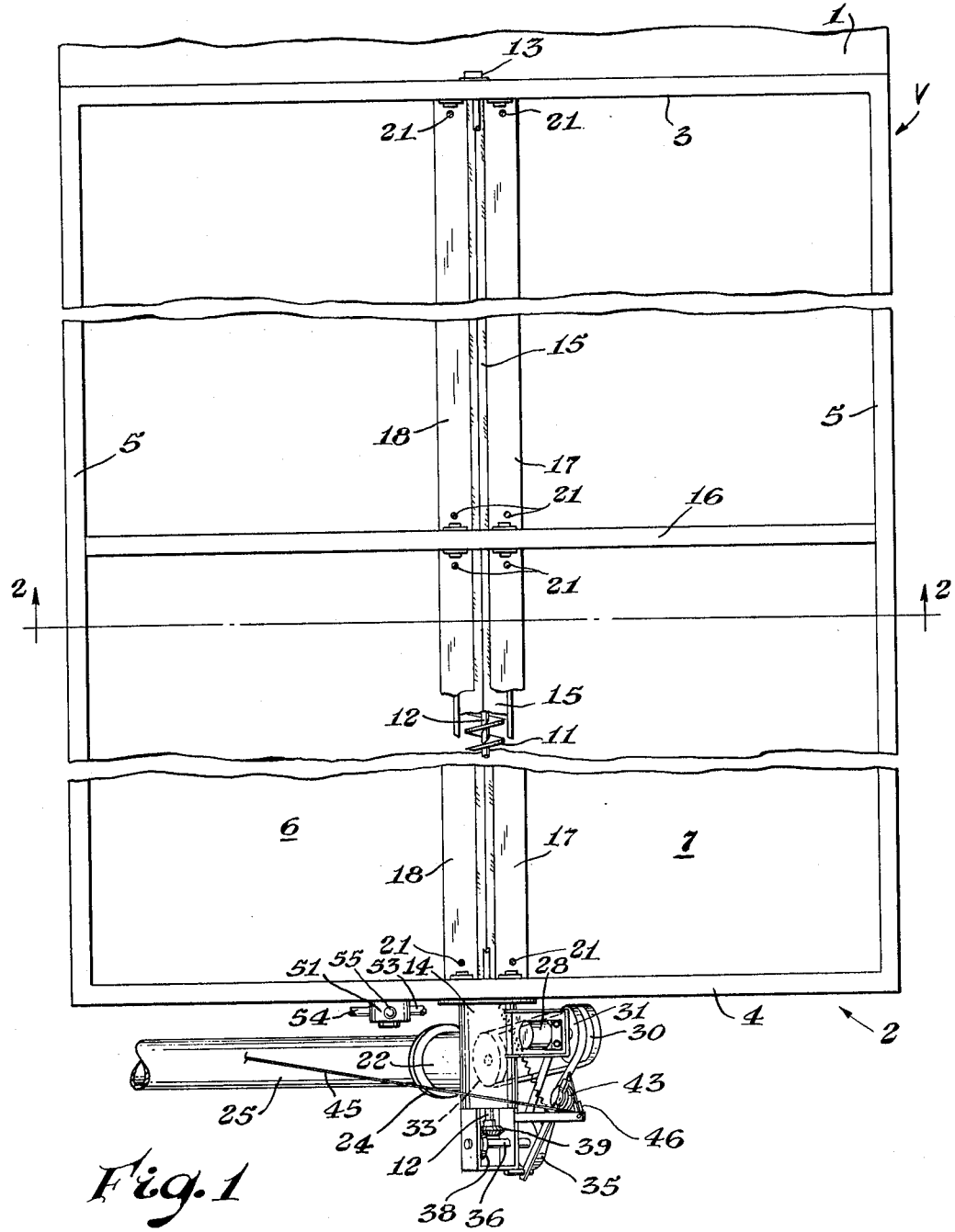
FIGURE 1 is a fragmentary, top plan view of a vehicle equipped with material handling apparatus constructed in accordance with the invention.

Apparatus constructed in accordance with the invention is adapted for use in conjunction with a wheeled vehicle V, such as a truck, having a flat bed 1 at its rear. Such trucks are well known and need not be described more fully.

A bulk materials container constructed according to the invention is represented generally by the reference character 2 and comprises a hollow, open top hopper having front and rear walls 3 and 4, respectively, side walls 5, and bottom walls or panels 6 and 7 which converge downwardly toward one another along lines forming an apex at substantially the longitudinal center line of the container. The side walls 5 and the bottom walls 6 and 7 are supported by longitudinally spaced apart uprights 8 which are secured at their lower ends to a base member 9. The base may be bolted, clamped, or otherwise removably secured to the vehicle bed 2.

Spanning the distance between the end walls 3 and 4 is a substantially V-shaped trough member 10 and into which materials in the container 2 are directed by the bottom walls 6 and 7. Within the trough 10 is a screw auger or conveyor 11 having a shaft 12 journaled at its forward end in a bearing 13 supported on the end wall 3, the opposite end of the auger extending through a discharge opening formed in the end wall 4. The discharge opening is surrounded by a receiving tube 14 which is provided with bearing means at its rearward end for journaling the rear end of the shaft 11.

Overlying the conveyor 11 and extending the full length of the container 2 is an inverted, V-shaped shield 15 having its opposite ends bolted or otherwise fixed to the end walls 3 and 4 of the container. The overall width of the shield 15 is greater than the diameter of the auger 11 to prevent the weight of material contained in the hopper from bearing directly on the conveyor, but the side edges of the shield terminate short of the bottom walls 6 and 7 to provide longitudinally extending openings between the shield and the bottom walls 6 and 7 so as to permit the fertilizer or other material in the hopper to be admitted to the trough 10.

Figure 2:
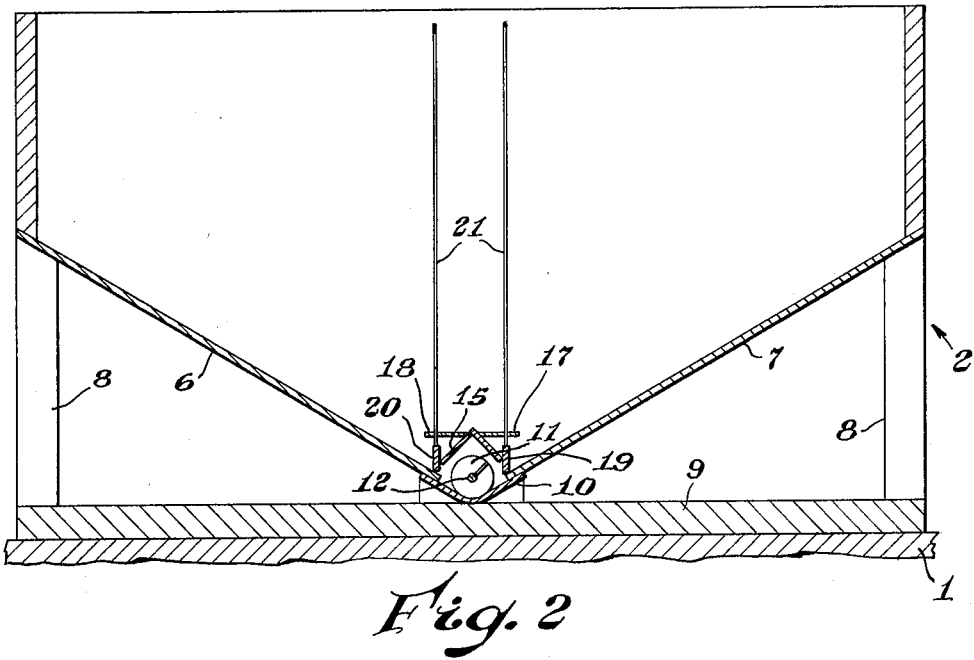
FIGURE 2 is a transverse sectional view taken on the line 2—2 of FIGURE 1.

In a preferred embodiment of the construction, one or more transverse partition members 16 span the width of the hopper body and fit closely against the side walls 5 and the bottom walls 6 and 7 so as to provide a plurality of compartments longitudinally of the container. The lower end of the partition is so shaped that the shield and conveyor pass under the partition. In each compartment and extending longitudinally thereof is a pair of generally horizontal mounting members 17 and 18 that are secured to the shield 15 and extend beyond the side edges of the latter, as is best shown in FIGURE 2. Beneath each member 17 and slidably engaging the side edge of the shield 15 is a vertically movable gate 19 and beneath each member 18 is a similar gate 20 in engagement with the opposite side edge of the shield. The gates are of greater height than the openings between the hopper bottom and the shield and are adapted to open and close the adjacent openings between the shield and the bottom of the hopper so as selectively to permit and prevent the delivery of material to the trough 10.

Means for independently opening and closing the gates 19 and 20 comprises, in each instance, a pair of vertically extending rods 21 extending through openings formed in the respective members 17 and 18 and being secured at their lower ends to the gates 19 or 20. At their upper ends the rods 21 are bent laterally so as to be capable of overlying the adjacent container end wall or partition. The length of each rod 21 is such that when it is elevated and the laterally bent end overlies the adjacent end wall or partition the associated gate 19 or 20 will be held in a raised position and permit material to be admitted to the trough 10.

The construction and arrangement of parts described thus far are such that rotation of the conveyor 11 by means yet to be described causes material in the trough 10 to be propelled rearwardly of the container for discharge to the receiving tube 14.

Figure 3:
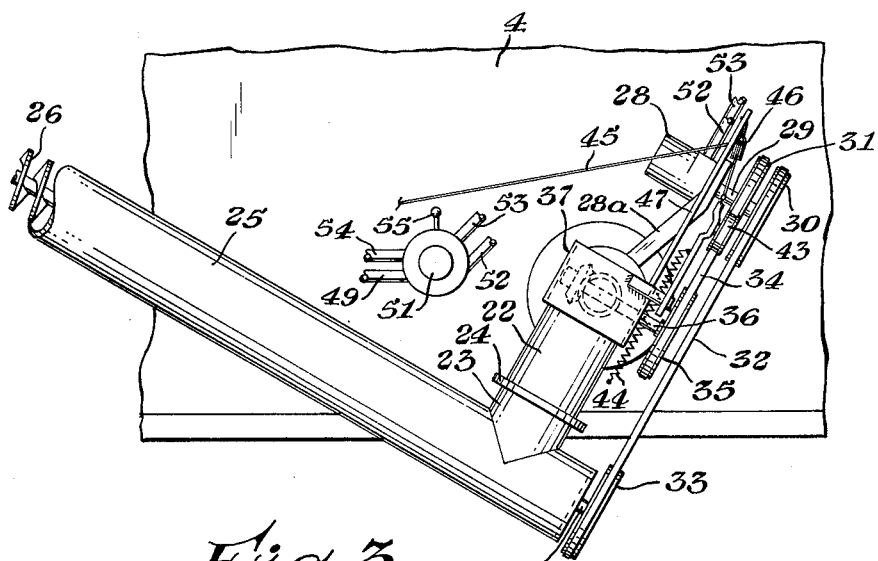
FIGURE 3 is a fragmentary, rear elevational view of the apparatus and illustrating the mechanism for effecting discharge of the material from the container.
Figure 4:
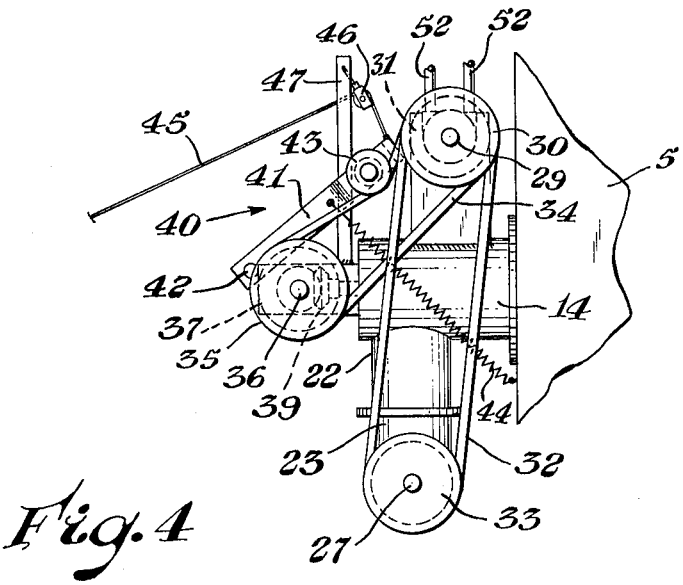
FIGURE 4 is a side elevation of the apparatus shown in FIGURE 3 as viewed in the direction of the arrows 4—4 in FIGURE 1.

The tube 14 has an opening in its lower surface and in which is received one end of a sleeve 22 that is inclined to the vertical, as is best illustrated in FIGURE 3. The other end of the sleeve 22 is removably connected to an inlet pipe 23 by means of an annular clamping ring 24 of known construction. The sleeve 23 communicates with a tubular housing 25 in which is rotatably mounted a screw auger or conveyor 26 having a shaft 27 extending through the rear wall of the housing 25. The arrangement is such that material introduced to the receiving member 14 is discharged by gravity to the housing 25 via the sleeve 22 and the inlet pipe 23. Material discharged to the housing 25 is conveyed through the latter by the screw conveyor mounted therein.

Preferably, the cross-sectional area of the sleeve 22 (and the pipe 23) is greater than the cross-sectional area of the member 14 so as to assure the avoidance of clogging of the latter. The cross-sectional area of the housing 25 may be the same as or smaller than the cross-sectional area of the sleeve 22, but should not be smaller than that of the member 14, thereby avoiding clogging of sleeve 22.

In the preferred construction, the conveyors 11 and 26 are driven by the same driving means which, in the disclosed embodiment, comprises a hydraulic motor 28 of known construction. The motor is mounted externally of the end wall 4 on a bracket 28a fixed to the member 14. The motor has a driven shaft 29 on which is mounted a pair of pulleys 30 and 31. Trained around the pulley 30 is a belt 32 which also is trained around a pulley 33 that is fixed on the conveyor shaft 27. Trained around the pulley 31 is a belt 34 that also is trained around a pulley 35 mounted on a shaft 36 that is journaled in a frame 37 fixed to the rear end of the tubular member 14. Fixed on the shaft 36 is a gear 38 that meshes with a gear 39 fixed on the auger shaft 12.

The belt 34 is of such length that in the absence of belt tensioning or clutch means no drive will be transmitted from the shaft 29 to the shaft 36. However, clutch means 40 is provided and comprises a lever 41 pivoted at one end on a shaft 42 that is secured to the frame 37. Adjacent the other end of the lever 41 is journaled a wheel 43 which rides on the belt 34. The lever 41 normally is urged into belt tensioning engagement with the belt 34 by means of a spring 44 having one of its ends connected to the lever 41 and its other end anchored to the end wall 4. To the free end of the lever 41 is connected a cable 45 that is reeved around a pulley block 46 which is supported on an arm 47 secured to the frame housing 37. The arrangement is such that a pulling force on the cable 45 will overcome the force of the spring 44 and permit the belt 34 to slacken, thereby interrupting the driving of the conveyor 11. When the cable 45 is released, however, the spring 44 once again acts to effect tensioning of the belt 34.

Figure 5:
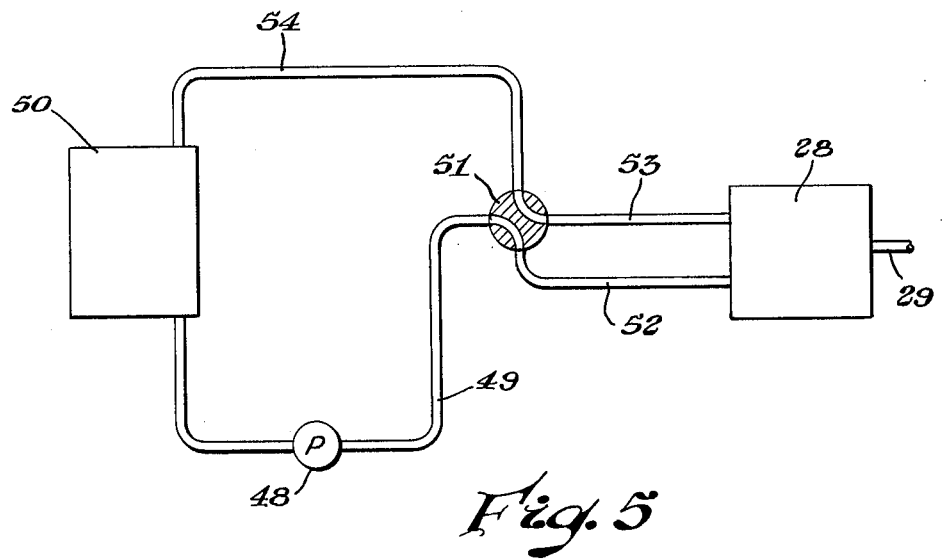
FIGURE 5 is a schematic piping diagram of hydraulic control means for the discharge apparatus.

Means for controlling the operation of the hydraulic motor 28 comprises a pump 48 that preferably forms part of the vehicle's equipment and which may be driven by the vehicle engine in the conventional manner. The pump is interposed in a hydraulic line 49 leading from a hydraulic fluid reservoir 50 to a valve 51 that is mounted on the end wall 4. Extending between the valve 51 and the motor 28 are fluid delivery and return lines 52 and 53, respectively, and from the valve 51 extends a fluid return line 54 for returning fluid to the reservoir 50. The arrangement is such that, when the valve is in the position indicated in FIGURE 5, fluid from the reservoir is pumped to the motor 28 for driving the latter and is returned from the motor to the reservoir via the return lines 53 and 54 and the valve 51. Upon adjustment of the valve 51 by means of an operating lever 55, fluid bypasses the motor 28 and circulates from the reservoir 50 through the line 49, the valve 51 and the line 54.

To condition the apparatus for use, the container 2, if not already on the bed of a vehicle, is placed on the latter by a suitable hoist and is bolted, clamped or otherwise fixed to the vehicle bed. Hydraulic lines 49 and 54 then may be connected to the valve 51. Thereafter, the vehicle may be driven to a source of bulk material such as granular fertilizer. If the container is provided with one or more partitions 16, the gates 19 and 20 should be closed prior to filling the container with bulk material, thereby enabling more than one kind of material to be loaded in the same container.

Following loading of the container, the vehicle may be driven to a field where fertilizer spreaders are to be loaded with fertilizer from the container 2. At this time, the gates 19 and 20 in the compartment from which material is to be writhdrawn may be raised so as to permit material in that compartment to be admitted to the trough 10.

The valve operating handle 55 may be adjusted to effect driving of the motor 28, whereupon the screw conveyors 11 and 26 will be driven simultaneously. As material is driven rearwardly of the container by the conveyor 11, it enters the receiving member 14, passes by gravity into the sleeve 22 and is discharged into the housing 25 through which it is driven by the conveyor 26. The free end of the housing 25 may be equipped with a flexible hose (not shown) which may discharge material into the fertilizer spreader. Preferably, the conveyor 26 is driven at a greater speed than the conveyor 11, providing an additional safeguard against clogging of the members 22 and 25.

When the fertilizer spreader is full, or nearly so, the operator may pull on the clutch operating cable 45 so as to disengage the conveyor 11 from the driving motor. This will prevent the delivery of additional material to the housing 25. Disengagement of the conveyor 11 from the driving motor will not disengage the conveyor 26, however, so the latter continues to convey any material previously delivered to the housing 25.

The unloading of material from the other compartments proceeds in exactly the same manner.

Apparatus of the character described is particularly advantageous for use by farmers inasmuch as the removability of the container 2 from the vehicle permits the latter to be put to many uses other than that of hauling fertilizer and similar materials. Moreover, the apparatus avoids the necessity of a person's having to handle bagged fertilizer and like materials, thereby effecting a saving in the cost of such material and eliminating the manual labor attendant the handling of bagged materials. Furthermore, the hopper-like construction of the container provides space between adjacent supporting posts 8 in which bagged seeds or other goods may be transported simultaneously with the material contained within the hopper.

The disclosed embodiment is representative of a presently preferred form of the invention, but is intended to be illustrative rather than definitive thereof. The invention is defined in the claims.

I claim:

1. Material handling apparatus comprising a container having side walls and a downwardly converging, substantially V-shaped bottom wall, one of said walls having an opening therein adjacent the apex of said bottom wall, conveyor means mounted in said container adjacent the apex of said bottom wall and extending the length thereof for conveying material out of said container through said opening; a partition member supported in said container between two of said side walls and lying athwart said conveyor means to divide said container into first and second compartments, said partition having an opening therein through which said conveyor means extends and said first compartment being defined by said partition and by the side wall of said container in which said opening is formed; a shield member overlying said conveyor means at least in said first compartment and having its side edges spaced vertically from said bottom wall to provide openings through which material may be introduced to said conveyor means; gate means at each side of said shield member and in sliding engagement therewith; means mounting said gate means for vertical movements away from and toward said bottom wall for selectively opening and closing said openings and respectively permitting and preventing the introduction of material to said conveyor means; and means connected to each of said gate means for moving each gate means vertically independently of the other.

2. The apparatus set forth in claim 1 including conveying means in communication with said conveyor means and located externally of said container for receiving material therefrom; and means for driving said conveyor means and said conveying means, said conveying means having a greater capacity than said conveyor means.

3. The apparatus set forth in claim 2 wherein said driving means comprises motor means connected to said conveying means and operable to drive the latter continuously, and clutch means interconnecting said motor means and said conveyor means for selectively connecting and disconnecting said driving means to and from said conveyor means.

4. The apparatus set forth in claim 3 wherein said driving means drives said conveying means at a greater rate of speed than said conveyor means.

References Cited by the Examiner

UNITED STATES PATENTS

| 1,437,863 | 12/1922 | Raymond | 222—317 |
| 2,586,279 | 2/1952 | White | 214—83.32 X |
| 2,614,708 | 10/1952 | Hoffstetter | 214—17.8 |
| 2,960,320 | 11/1960 | Heider. | |
| 3,021,025 | 2/1962 | Sudenga et al. | 214—522 |
| 3,108,703 | 10/1963 | Horne et al. | 214—17 X |

GERALD M. FORLENZA, *Primary Examiner.*

HUGO O. SCHULZ, *Examiner.*